United States Patent [19]

Masri et al.

[11] 4,125,708

[45] Nov. 14, 1978

[54] CHITOSAN MODIFIED WITH ANIONIC AGENT AND GLUTARALDEHYDE

[75] Inventors: Merle S. Masri, Emeryville; Virginia G. Randall, El Cerrito, both of Calif.

[73] Assignee: The United States of America as represented by the Secretary of Agriculture, Washington, D.C.

[21] Appl. No.: 768,820

[22] Filed: Feb. 15, 1977

[51] Int. Cl.$^2$ ............................................. C08B 37/08
[52] U.S. Cl. ...................................... 536/20; 210/24; 260/9; 260/17.4 ST; 526/23; 536/104; 536/106
[58] Field of Search ............................................ 536/20

[56] References Cited

U.S. PATENT DOCUMENTS

| | | | |
|---|---|---|---|
| 2,040,879 | 5/1936 | Rigby | 536/20 |
| 2,072,771 | 3/1937 | Rigby | 536/20 |
| 2,670,329 | 2/1954 | Jones | 536/20 X |
| 2,689,244 | 9/1954 | Jones | 536/20 |
| 2,755,275 | 7/1956 | Cushing et al. | 536/20 |
| 2,783,148 | 2/1957 | Gyorgy et al. | 536/20 X |
| 2,831,851 | 4/1958 | Vogler | 536/20 |
| 2,832,766 | 4/1958 | Wolfrom | 536/20 |
| 2,910,408 | 10/1959 | Pope et al. | 536/20 X |
| 3,155,575 | 11/1964 | Doczi et al. | 536/20 X |
| 3,761,585 | 9/1973 | Mullan et al. | 260/112 R X |
| 3,796,634 | 3/1974 | Haynes et al. | 260/112 R X |
| 3,823,129 | 7/1974 | Kalb et al. | 260/123.5 |
| 3,985,696 | 10/1976 | Aignesberger et al. | 260/67.6 R X |
| 4,029,727 | 6/1977 | Austin et al. | 536/20 X |
| 4,056,432 | 11/1977 | Slagel et al. | 260/17.4 GC |
| 4,059,457 | 11/1977 | Austin | 536/20 X |
| 4,063,016 | 12/1977 | Austin | 536/20 |
| 4,066,735 | 1/1978 | Peniston et al. | 536/20 X |

*Primary Examiner*—Howard E. Schain
*Attorney, Agent, or Firm*—M. Howard Silverstein; David G. McConnell; Theodore J. Leitereg

[57] ABSTRACT

Superoxy-anion-forming metals, such as chromium, manganese, and the like, are removed from materials containing the same by contacting the material with an anionically-modified, nitrogen-containing polymer, such as sulfite-modified, sulfate-modified, or chloride-modified chitosan.

1 Claim, No Drawings

CHITOSAN MODIFIED WITH ANIONIC AGENT AND GLUTARALDEHYDE

BACKGROUND OF THE INVENTION

1. Field of the Invention

This invention relates to and has among its objects the provision of new methods for removal of superoxy-anion-forming metals from materials containing the same. Further objects of the invention will be evident from the following description wherein parts and percentages are by weight unless otherwise specified. The abbreviation "ppm" means parts per million and "ppb" means parts per billion.

2. Description of the Prior Art

Chromium and other metal compounds are widely used in American industry. For example, large amounts of chromium-containing materials are employed in the steel industry, in metal finishing and electroplating operations, in dyeing of fabrics, in hide and leather tanning, etc.

The waste materials which arise from the use of metal compounds must be disposed of, and this presents a problem from an ecological standpoint. Many of these compounds are extremely toxic, thus a safe concentration and distribution of these compounds in the environment must be maintained. Furthermore, metal compounds, particularly chromium compounds, impair biodegradation of organic matter in the biological processes of sewage treatment. Finally, the metals tend to accumulate and be concentrated in the food chain, posing a threat to the well-being of humans and other animals.

To control the above detrimental results from the use of metal compounds, federal, state, and municipal regulations have been established for allowable concentrations of these metals in waste streams which can be released into the environment, i.e., into waterways such as streams, rivers, lakes, and the like. Such regulations are expected to be made even more stringent in the future. It is desirable to reduce the chromium level, e.g., in the waste to less than 50 ppb (the present standard for drinking water).

Present methods employed to lower the chromium content of waste streams involve conversion of hexavalent chromium ion (the most prevalent form of chromium in waste streams) to the trivalent form followed by precipitation as chromium hydroxide. The precipitate is then removed by filtration or as settled sludge. This method requires wasteful use of reagents such as sulfur dioxide as the reducing agent and alkali as the precipitating agent. In addition, the reduction and precipitation steps must be adequately monitored. Lastly, both the filtration, and settling steps are cumbersome and require inordinate amounts of space.

SUMMARY OF THE INVENTION

The invention described herein provides means for alleviating the above problems. In accordance with the invention superoxy-anion-forming metal-containing waste material can be treated to reduce the metal ion content therein to an environmentally acceptable level. In the process of the invention the material containing the superoxy-anion-forming metal is contacted with an anionically-modified, nitrogen-containing polymer. After such contact the waste material can be discharged safely into waterways without harm to humans or other animals.

The primary advantage of the invention is that the metal ion level in waste material can be reduced below 50 ppb to a level of 0 to 10 ppb. Thus, the invention may be used to remove both bulk and trace amounts of these metals. This end can be accomplished without placing undue hardships on the industries involved.

Another advantage of the invention is that the metals may be recovered. Consequently, these economically important materials may be recycled or re-used and are thus conserved.

Another advantage of the invention is that the anionically-modified, nitrogen-containing polymer may be regenerated and re-used in further purification procedures to remove chromium.

A further advantage of the invention is its ease of operation. In the instant method the metal-containing waste material is contacted with an anionically-modified, nitrogen-containing polymer. Then, the waste material is separated from the polymer, which has removed the chromium from the waste material.

DESCRIPTION OF THE PREFERRED EMBODIMENTS

In the following description the removal of chromium from chromium-containing waste materials is emphasized. This emphasis is by way of illustration and not limitation. In its broad ambit the invention can be applied to remove superoxy-anion-forming metals such as manganese, chromium, molybdenum, vanadium, niobium, arsenic, antimony, germanium, indium, gallium, aluminum, boron, etc. The term "superoxy-anion-forming" refers to the fact that these metals form "ate" ions with oxygen. For example, manganate ion, dichromate ion, molybdenate ion, vanadate ion, indate ion, antimonate ion, chromate ion, arsenate ion, borate ion, aluminate ion, germanate ion, gallate ion, etc., are the most common occurring forms of the above mentioned metals.

The chromium-containing material is contacted with an anionically-modified, nitrogen-containing polymer in an amount and for a period of time sufficient to effect removal of the chromium. Anionic modification of the nitrogen-containing polymers consists of introducing certain anionic groups into the polymer. The anionic groups which render the nitrogen-containing polymer effective in removing chromium are sulfite, sulfate, chloride, hexafluoride, and borate groups.

In a first step in the practice of the invention an anionically-modified, nitrogen-containing polymer is prepared. Modification is obtained by treating a nitrogen-containing polymer with an appropriate source of the above anionic groups such as an acidic form of the anion or a salt of the anion. It should be noted that the reaction mixture should be maintained at a slightly acid pH level when a salt of the anion is used. Generally, the polymer to be modified is mixed with a water solution of the modifying agent in an amount sufficient to react with all the titratable basic groups in the nitrogen-containing polymer. Usually, an excess of the modifying agent is used. The amount of modifying agent to be employed to modify a particular nitrogen-containing polymer may be determined by ascertaining the number of titratable basic groups in the polymer according to conventional techniques and procedures, such as simple acid-base titration and the like.

Sulfite modification is obtained by treating an appropriate nitrogen-containing polymer with sulfur dioxide or a compound which yields sulfur dioxide, such as sulfurous acid, sulfite anions, bisulfite anions, dithionite anions, etc. The temperature during the modification is about 20° to 30° C. and the reaction is continued for a period of about 1 to 3 hours. The so-produced sulfite-modified polymer is collected by conventional means such as filtration, decantation, and the like. The product may be washed with water followed by organic solvents such as methanol, ethanol, ethyl ether, etc., to further purify it. Following the washing step the sulfite modified polymer is dried and ready for use.

Sulfate modification of the nitrogen-containing polymer is obtained by treating the polymer with sulfuric acid or a compound which produces sulfuric acid such as sulfur trioxide, sulfate anions, bisulfate anions, etc. The reaction parameters are as described above for sulfite modification. The sulfate-modified, nitrogen-containing polymer is collected and purified as mentioned above.

Chloride modification of the nitrogen-containing polymer can be effectuated by reacting the polymer with hydrochloric acid or a chloride salt, such as sodium chloride, etc., in the presence of a weak acid, e.g., acetic acid and the like, under conditions similar to those described above for sulfite modification. The reaction generally takes place in about 0.1 to 3 hours.

The nitrogen-containing polymer can be treated with a salt of titanium hexafluoride or zirconium hexafluoride to produce a hexafluoride-modified polymer. Usually, this reaction is carried out at a temperature of about 20° to 50° C. for a period of 0.1 to 3 hours. It may be required to dissolve the hexafluoride salt by heating above 50° C. for a short period.

Borate-modified nitrogen-containing polymers can be prepared by reacting the nitrogen-containing polymer with a source of borate ions, such as sodium tetraborate, etc., in the presence of an acid, such as acetic or dilute hydrochloric acid. The modification is generally carried out at a temperature of about 20° to 30° C. for 1 to 16 hours.

Polymers which can be used in the process of the invention include natural and synthetic nitrogen-containing polymers such as chitosan, poly (amino-styrene), poly (vinylpyridine), poly (diaminodiphenylmethane), poly (amino-aniline), poly (ethylenimine), poly (vinylpyrrolidone), and the like.

Chitosan is a polyamino polysaccharide obtained by N-deacetylation of chitin with strong alkali and heat. Chitin is a polysaccharide wherein the primary repeating unit in the molecule is 2-deoxy-2-(acetylamino) glucose. In general, about one out of every six units in chitin is not acetylated, whereas in chitosan essentially all the repeating units are not acetylated. It should be noted that the extent of non-acetylation can be controlled by the severity of the deacetylation reaction.

Chitin is readily prepared by removing the impurities from shells of crab, shrimp, lobsters, crayfish, and the like, which are abundantly available from seafood processing plants, and from exoskeletons of insects.

In a next step in the practice of the invention, the chromium-containing waste material is contacted with the anionically-modified, nitrogen-containing polymer. The polymer may be formed into a bed and the chromium-containing material can be allowed to percolate therethrough. Alternately, the modified polymer may be placed in a column and the contaminated material can be pumped therethrough. It is obvious, of course, that the method of contacting the anionically-modified polymer with the chromium-containing material is not critical. Other methods will be suggested to those skilled in the art. The critical point is that contact be effected and maintained for a period long enough for the chromium impurities to be removed by the modified polymer. Generally, gravity flow rate of contaminated water through a column of modified polymer provides a sufficient contact time. The gravity flow rate of water through the modified polymer is approximately 1 to 10 ml. per minute per gram of polymer.

In a preferred embodiment of the invention the chromium-containing waste material is maintained slightly acidic by addition of weak acids such as acetic acid, citric acid, and so forth. It is believed the acidic pH assures that the chromium will be in the dichromate form, which seemingly is more efficiently absorbed by the modified, nitrogen-containing polymer than the chromate form.

It is within the compass of the invention to recover the removed chromium from the modified polymer thereby regenerating the polymer for further use and conserving the chromium. To this end the "spent" polymer, i.e., polymer which has become exhausted with chromium, is treated as described above with an anionic-modifying agent under slightly acidic conditions. The chromium can be collected and the regenerated polymer can be re-used for removal of chromium as mentioned above. It may be necessary to treat the polymer with dilute alkali, such as sodium or potassium hydroxide, prior to treatment with an anionic-modifying agent to aid in removal of the bound chromium and render the polymer receptive to anionic modification.

The method of the invention can be used to remove both bulk and trace amounts of chromium compounds. Finishing columns can be used to remove trace amounts of chromium and then these finishing columns with a relatively small amount of bonded chromium can be used to replace columns which have become exhausted in removing bulk amounts of chromium. Furthermore, bulk amounts of chromium may be removed first by conventional procedures, and then the process of the invention can be applied to remove trace amounts of chromium.

A particular advantage of the invention lies in the fact that it can be adapted easily to present water purification systems whether industrial or municipal. Since most water purification systems involve a filtration procedure, the addition of an extra filter containing an anionically-modified, nitrogen-containing polymer would be routine.

It is also within the compass of the invention to employ an anionically-modified, nitrogen-containing polymer which has the further modification of having been treated with a crosslinking reagent such as glyoxal, glutaraldehyde, dialdehyde starch or the like. The crosslinking may be accomplished by reacting the anionically-modified polymer with the crosslinking agent. On the other hand, the nitrogen-containing polymer can be crosslinked first and then treated to introduce the anionic modification. Usually, about 0.1 to 0.3 parts of crosslinking agent per part of polymer are employed and the reaction is conducted for a period of 1–48 hrs. The crosslinked, anionically-modified, nitrogen-containing product exhibits increased stability and insolubility over the non-crosslinked product. The crosslinked polymer is used as described above to remove chromium from chromium-containing materials.

It is important to note that the chromium-containing waste material may also contain sulfate ions, particularly if the waste is produced during dyeing of fabrics and the like. In this instance, it may be necessary to pretreat the waste to remove the sulfate ions prior to treatment of the waste in accordance with the invention because these sulfate ions are not bound to a nitrogen-containing polymer and consequently interfere with the process of the invention. To this end the waste can be treated first with a source of barium ions, which will precipitate barium sulfate. Alternatively, the waste may be contacted with chitosan. The sulfate ions will combine with the chitosan to form chitosan sulfate. In either case the waste, after removal of sulfate ions, can then be contacted with an anionically-modified, nitrogen-containing polymer to effect removal of chromium. Other ions which may interfere with the process of the invention can be removed according to similar procedures.

It should be noted further that sulfate ion removal with chitosan results in the production of chitosan sulfate, which itself is an anionically-modified, nitrogen-containing polymer. Thus, not only will sulfate ions be removed from the waste, but some reduction in chromium content will be realized. The effluent with reduced chromium can either be contacted again with the same chitosan sulfate or it may be contacted with any other freshly-prepared anionically-modified, nitrogen-containing polymer to reduce the chromium content to an environmentally acceptable level.

The amount of chromium removal from solutions containing both chromium and sulfate ions is dependent on the pH of the effluent. For maximum removal of chromium using chitosan in the presence of sulfate ions, the effluent should be slightly acidic, i.e., about pH 5.0-6.0.

It is within the compass of the invention to remove some superoxy-anion-forming metals with a nitrogen-containing polymer alone. For example, chitosan will remove substantial amounts of borate, titanium hexafluoride, and zirconium hexafluoride anions without modification. However, in most instances anionic modification of the nitrogen-containing polymer is necessary to effectuate removal of the metals. Furthermore, anionic modification of the polymer enhances the ability of the polymer to remove metals in all instances.

EXAMPLES

The invention is further demonstrated by the following illustrative examples.

EXAMPLE 1

Preparation of Sulfite-modified Chitosan (i) Chitosan was ground in a Wiley Mill to pass 1 millimeter screen and 40 g. of the ground chitosan was mixed with 80 ml. of water saturated with sulfur dioxide (8.5%). The mixture was stirred for 1 hr. at 25° C. and allowed to sit for 2 hrs. at 25° C. The product (hereinafter referred to as $CHT-SO_3(i)$) was separated from the mixture by filtration, washed with 1 l. of water, 200 ml. of methanol, and 100 ml. of ethyl ether, and then air-dried to give 43 g. of modified chitosan.

A portion of the modified chitosan released sulfur dioxide when heated on a steam bath or when treated with dilute aqueous hydrochloric or sulfuric acid. The product also titrated 2.4 milliequivalents of iodine per gram.

(ii) Chitosan (20 g.) was ground to pass a 40-60 mesh screen and mixed with 150 millimoles of sodium dithionite and 100 millimoles of acetic acid in 200 ml. of water. The mixture was stirred and held at 25° C. for 2 hrs.

The product ($CHT-SO_3(ii)$) was separated, washed, and dried as described in Part (i). The dried material weighed 24.5 g. and titrated 0.8 milliequivalents of iodine per gram.

(iii) The procedure described in Part (ii) was followed except that the 20-g. sample of chitosan was treated with 100 ml. of 1 M sodium bisulfite for 1 hr. The air-dried product ($CHT-SO_3(iii)$) weighed 25.3 g. and titrated 1.28 milliequivalents of iodine per gram.

(iv) Chitosan (20 g., 40-60 mesh) was contacted with 80 ml. of water containing 15 millimoles of glutaraldehyde for 2 hrs. at ambient temperature. The product was washed with water and air-dried to give 22.4 g.

The glutaraldehyde-treated material (22.4 g.) was mixed with 100 ml. of a 5% aqueous sulfur dioxide solution at 25° C. for 2 hrs. The product ($CHT-GA-SO_3$) was treated as described in Part (i) and weighed 24.3 g. The iodine titration value was 2.8 milliequivalents per gram.

EXAMPLE 2

Bulk Removal of Chromium Using $CHT-SO_3(i)$

A 1 g.-portion of $CHT-SO_3(i)$ from Example 1 was contacted with gentle shaking successively with three 50 ml.-portions of an aqueous solution containing 1000 ppm of potassium dichromate. Each 50 ml.-portion was contacted with the polymer for 5 min. and then decanted. Analysis by reagent test strip for chromate of the first and second decants indicated that total removal of chromium had taken place. The third decant contained 10 ppm chromium.

The $CHT-SO_3(i)$ became dark brown in color, weighed 1.1 g., and assayed at 46,000 ppm chromium by x-ray fluorescence analysis.

EXAMPLE 3

Continuous Removal of Chromium Using $CHT-SO_3(i)$

A glass column (12 mm i.d.) was packed with 6 g. of $CHT-SO_3(i)$ to a height of 22 cm. and an aqueous solution containing 1000 ppm potassium dichromate was passed through the column in the upflow direction at a rate of 450 ml./hr. Eluate fractions (100 ml.) were collected and found to contain 0-10 ppb chromium by atomic absorption. Approximately 2.2. l. of the dichromate solution was passed through the column before the break point, i.e., exhaustion of the polymer with the chromium, was reached. A 25 ml.-sample of the eluate after break point was examined for chromium content; the sample contained 81 ppm chromium.

It was further determined that the column capacity was 2.5 milliequivalents of hexavalent chromium per gram of polymer.

EXAMPLE 4

Removal of Chromium with $CHT-GA-SO_3$

The procedure described in Example 3 was followed using 6 g. of $CHT-GA-SO_3$ as the column substrate. Analysis of the eluate fractions prior to the break point indicated 0 to 10 ppb hexavalent chromium. About 2 l. of the dichromate was passed through the column before break point was reached.

Regeneration was accomplished by passing 30 ml. of 2% sulfur dioxide in water through the column followed by 300 ml. of 1% aqueous sulfur dioxide. The regenerated column was again used as described above with similar results.

EXAMPLE 5

Removal of Chromium from Spent Dyebath Using CHT—GA—SO$_3$

A dyebath with the following composition (per liter of water) was prepared: 0.05 g. potassium dichromate, 0.2 g. ammonium acetate, 0.025 g. of chrome Fast Blue RLL, 0.075 g. chrome Fast Yellow ME, and 0.15 g. Algebal B (wetting agent produced by CIBA Chemical Company). A wool sample (5 g. per 1 l. of bath solution) was treated so as to exhaust the dye on the wool. Analysis of the spent dyebath indicated that the chromium content was essentially unchanged.

A column was prepared using 6 g. of CHT—GA—SO$_3$ as described in Example 4. Then 3.1 l. of the spent dyebath from above was passed through the column without reaching the break point.

The following eluate fractions were collected and analyzed for chromium content.

| Eluate fraction | Volume (ml) | Hexavalent chromium (ppm) |
|---|---|---|
| 1 | 500 | 0.03 |
| 2 | 600 | 0.07 |
| 3 | 900 | 0.28 |
| 4 | 1080 | 0.42 |

EXAMPLE 6

Preparation of Sulfite-modified Poly (p-aminostyrene)

The procedure outlined in Example 1, Part i, was followed. Poly (p-aminostyrene), 15 g., was stirred with 115 ml. of a 6% aqueous sulfur dioxide solution for 3 hrs. at 25° C. The product (PAS—SO$_3$) weighed 18.3 g. and titrated 4.8 milliequivalents of iodine per gram.

EXAMPLE 7

Removal of Chromium Using PAS—SO$_3$

The procedure described in Example 3 was employed. A 4 g.-portion of PAS—SO$_3$ was packed into a glass column (12 mm i.d.) to a height of 13 cm. The eluate fractions contained 0 to 10 ppb hexavalent chromium. About 0.7 l. of effluent was passed through the column to reach the break point. A 50 ml.-eluate fraction taken immediately after break point contained 32 ppm hexavalent chromium.

The above procedure was repeated using only poly (p-aminostyrene) rather than PAS—SO$_3$. Break point was obtained immediately after one bed-volume of the aqueous dichromate solution was passed through the column. This experiment demonstrates that the non-modified polymer is ineffective in removing chromium.

EXAMPLE 8

Preparation of Sulfate-modified Chitosan Crosslinked with Glutaraldehyde

The procedure described in Example 1, Part iv, was employed. A 20 g.-sample of chitosan was contacted with 80 ml. of water containing 30 millimoles of glutaraldehyde for 2.5 hrs. at ambient temperature.

After washing with water and air-drying, the product from above was mixed with 250 ml. of 1 M sulfuric acid and 310 ml. of 1 M ammonium sulfate at 25° C. for 2 hrs. The resulting product (CHT—GA—SO$_4$) was treated as described in Example 1. Presence of bound sulfate was demonstrated by treating the product with dilute potassium hydroxide; sulfate ion was released.

EXAMPLE 9

Continuous Removal of Chromium Using CHT—GA—SO$_4$

A glass column (12 mm i.d.) was packed with 11.6 g. of CHT—GA—SO$_4$ and an aqueous solution containing 1000 ppm potassium dichromate was passed through the column in the upflow direction at a rate of 450 ml./hr. An eluate fraction (2.4 l.) was collected and found to contain 7 ppm chromium by atomic absorption. A second eluate fraction (0.7 l.) was found to contain 28 ppm chromium. A further increase in chromium content in the eluate fractions from 28 ppm to 170 ppm occurred as the volume of solution passed increased from 3.1 l. to 4.4 l.

EXAMPLE 10

Preparation of Hexafluoride-modified Chitosan

A. Chitosan (5.0 g., 30–40 mesh) was mixed with 50 ml. of an aqueous solution containing 1.0 g. of potassium titanium hexafluoride. The mixture was heated on a steam bath for 20 min. to dissolve the salt and then was held at ambient temperature for 1 hr. The product (CHT—TiF$_6$) was separated from the reaction mixture by filtration, washed with 200 ml. of water, 100 ml. of methanol, and 100 ml. of ethyl ether, and then air-dried (yield: 5.8 g.).

X-ray photoelectron spectroscopy indicated that the product contained 3.2% titanium and 4% fluorine.

B. The procedure described in Part A was followed except that potassium zirconium hexafluoride was used in place of potassium titanium hexafluoride. The yield of product (CHT—ZrF$_6$) was 5.8 g. Analysis of the product by x-ray photoelectron spectroscopy indicated that the product contained 4.0% zirconium and 14% fluorine.

EXAMPLE 11

Removal of Chromium Using CHT—TiF$_6$ and CHT—ZrF$_6$

A 1 g.-portion of CHT—TiF$_6$ from Example 10 was contacted with gentle shaking with five 50 ml.-portions of an aqueous solution each containing 1000 ppm of sodium dichromate. Each 50 ml.-portion was contacted with the polymer for 5 min. and then decanted. Analysis by atomic absorption of the decants gave the following results:

| Decant | Chromium Content (ppm) |
|---|---|
| 1 | 9.6 |
| 2 | 19.5 |
| 3 | 31.0 |
| 4 | 46.5 |
| 5 | 67.5 |

The above procedure was repeated using CHT—ZrF$_6$ with the following results:

| Decant | Chromium Content (ppm) |
|---|---|
| 1 | 1.7 |
| 2 | 4.1 |
| 3 | 5.9 |

-continued

| Decant | Chromium Content (ppm) |
|---|---|
| 4 | 8.5 |
| 5 | 9.7 |

EXAMPLE 12

Preparation of Borate-modified Chitosan

Chitosan (15 g., 30–40 mesh) was mixed with a solution of 12.5 g. of sodium borate decahydrate in 200 ml. of water and 100 ml. of 1 N acetic acid. The mixture was allowed to stand for 16 hrs. at ambient temperature. The product (CHT—BO$_4$) was recovered as described in Example 10, Part A, and weighed 13.8 g.

Analysis of the product by x-ray photoelectron spectroscopy indicated the presence of 3.0% boron.

EXAMPLE 13

Chromium Removal Using CHT—BO$_4$

A 1 g.-portion of CHT—BO$_4$ from Example 12 was contacted with three 50 ml.-portions of sodium dichromate (1000 ppm in water). Each portion was contacted with the polymer for 5 min. and then decanted.

Analysis by atomic absorption of the decants gave the following results:

| Decant | Chromium Content (ppm) |
|---|---|
| 1 | 8.4 |
| 2 | 21.0 |
| 3 | 85 |

EXAMPLE 14

Preparation of Chloride-modified Chitosan Crosslinked with Glutaraldehyde

A 200 g.-sample of chitosan was contacted with 800 ml. of water containing 300 millimoles of glutaraldehyde for 48 hrs. at ambient temperature. The product was washed with water, air-dried to give 230.5 g. of product. A 10 g.-sample of this product was mixed with 100 ml. of 0.3 N hydrochloric acid. The reaction mixture was allowed to stand for 3 hrs. The product (CHT—GA—Cl) was collected by filtration, washed with water and dried; the yield was 10.9 g.

The presence of chloride in the product was demonstrated by the release of chloride ion when the product was treated with dilute aqueous sodium hydroxide.

EXAMPLE 15

Removal of Chromium Using CHT—GA—Cl

A 1 g.-portion of CHT—GA—Cl from Example 14 was contacted with gentle shaking with five 50 ml.-portions of sodium dichromate (1000 ppm in water). Each portion was contacted with the polymer for 5 min. and then decanted.

Analysis by atomic absorption of the decants gave the following results:

| Decant | Chromium Content (ppm) |
|---|---|
| 1 | 4.4 |
| 2 | 6.0 |
| 3 | 8.7 |
| 4 | 10.3 |

-continued

| Decant | Chromium Content (ppm) |
|---|---|
| 5 | 11.9 |

EXAMPLE 16

Simultaneous Anionic Modification of Chitosan and Removal of Chromium

A 20 g.-sample of chitosan (30–40 mesh) was treated with glutaraldehyde as described in Example 1, Part iv.

The glutaraldehyde modified chitosan (10 g.) was placed in a glass column (12 mm i.d.). An aqueous solution (1.5 l.) containing 1000 ppm of potassium dichromate and 1000 ppm sodium sulfate was passed through the column in the upflow-direction at a rate of 500 ml. per hr. Acetic acid (1 N) was added to the solution so that the pH of the eluate was always slightly acidic (about 5). Three eluate fractions (500 ml. each) were collected and found to contain respectively 12, 18, and 22 ppm chromium by atomic absorption.

This experiment indicates that the nitrogen-containing polymer can be modified and chromium removed from a solution simultaneously.

EXAMPLE 17

Preparation of Sulfite-modified Poly (ethylenimine) Crosslinked with Glutaraldehyde To 32 ml. of an aqueous solution containing 10.5 g. of poly (ethylenimine) was added 20 ml. of a 25% aqueous solution of glutaraldehyde with vigorous stirring. A gel quickly formed and gradually became granularized. The product was collected by filtration, washed with water, and was air-dried (19.0 g.).

A 15.2 g. sample of the above material was contacted with 100 ml. of a 2.5% aqueous solution of sulfur dioxide for a period of 2 hrs. The product (PEI—GA—SO$_3$) was collected by filtration, washed with water, and air-dried (15.8 g.).

The sulfite-modified product titrated 6.3 milliequivalents of iodine per gram. The product released sulfur dioxide gas when heated on a steam bath or when treated with dilute hydrochloric acid.

EXAMPLE 18

Removal of Chromium Using PEI—GA—SO$_3$

A. The procedure described in Example 15 was followed. The results are summarized below.

| Decant | Chromium Content (ppm) |
|---|---|
| 1 | 19 |
| 2 | 24 |
| 3 | 23 |
| 4 | 28 |
| 5 | 44 |

B. A 10 g.-sample of PEI—GA—SO$_3$, prepared in Example 17, was packed into a glass column (12 mm i.d.) to a height of 24 cm. An aqueous solution containing 1000 ppm of potassium dichromate was passed through the column in the up-flow direction at a rate of 480 ml. per hr.

The following eluates were collected and analyzed for chromium content by atomic absorption:

| Eluate | | |
|---|---|---|
| Number | Volume (l.) | Chromium Content (ppm) |
| 1 | 2.0 | 0.5 |
| 2 | 0.9 | 6.2 |
| 3 | 0.7 | 57.0 |

EXAMPLE 19

Removal of Manganese Using CHT—GA—Cl

A 1 g.-portion of CHT—GA—Cl from Example 14 was contacted with gentle shaking with eleven 50 ml.-portions of potassium permanganate (1000 ppm in water). Each portion was contacted with the polymer for 5 min. and then decanted.

Eluate fractions 1-9 were free of manganese based on visual examination. Fractions 10 and 11 contained permanganate ion as evidenced by their slightly purple color.

Analysis of the decants by atomic absorption gave the following results:

| Decant | Manganese Content (ppm) |
|---|---|
| 1-7 | 1.4 |
| 8 | 1.7 |
| 9 | 8.5 |
| 10 | 50.6 |
| 11 | 126.8 |

Having thus described our invention, we claim:

1. An insolubilized composition for removing superoxyanion-forming metals from materials containing the same, consisting of chitosan modified at all the titratable basic groups thereof with an anionic modifying agent selected from the group consisting of sulfite, sulfate, chloride, borate, and hexafluoride and further modified with glutaraldehyde in an amount of 0.1-0.3 parts per part of chitosan.

* * * * *